United States Patent [19]

Müller et al.

[11] 4,143,102
[45] Mar. 6, 1979

[54] CONTROL ARRANGEMENT FOR MIXTURE COMPRESSING COMBUSTION ENGINES

[75] Inventors: Hans-Jürgen Müller, Gelsenkirchen; Asoke Chattopadhayhay, Neuss-Norf, both of Fed. Rep. of Germany

[73] Assignee: Pierburgh GmbH & Co. KG, Neuss, Fed. Rep. of Germany

[21] Appl. No.: 913,210

[22] Filed: Jun. 6, 1978

Related U.S. Application Data

[63] Continuation-in-part of Ser. No. 750,895, Dec. 15, 1976, abandoned.

[30] Foreign Application Priority Data

Dec. 22, 1975 [DE] Fed. Rep. of Germany ....... 2557968

[51] Int. Cl.$^2$ ............................................. F02M 69/00
[52] U.S. Cl. ........................... 261/50 A; 123/139 AW; 123/140 CC
[58] Field of Search .............. 261/50 A; 123/139 AW, 123/140 CC

[56] References Cited

U.S. PATENT DOCUMENTS

| | | | |
|---|---|---|---|
| 1,162,680 | 11/1915 | Buick | 261/50 A |
| 1,606,922 | 11/1926 | Chandler | 261/44 R |
| 1,623,180 | 4/1927 | Gustafson | 261/50 A |
| 1,840,570 | 1/1932 | Dilworth | 261/46 |
| 2,038,785 | 4/1936 | Gould | 261/44 R |
| 2,078,849 | 4/1937 | Grosjean | 261/44 R |
| 2,225,989 | 12/1940 | Grosjean | 261/44 R |
| 3,284,063 | 11/1966 | Bickhaus et al. | 261/50 A |
| 3,342,462 | 9/1967 | Mick | 261/50 A |
| 3,777,727 | 12/1973 | Kirchner et al. | 261/50 A |
| 3,929,114 | 12/1975 | Chattopadhayay et al. | 261/50 A |
| 3,970,065 | 7/1976 | Kaibara et al. | 123/140 CC |

FOREIGN PATENT DOCUMENTS

| | | | |
|---|---|---|---|
| 540441 | 5/1957 | Canada | 261/50 A |
| 2307136 | 4/1976 | France | 123/139 AW |

*Primary Examiner*—Tim R. Miles
*Attorney, Agent, or Firm*—Haseltine, Lake & Waters

[57] ABSTRACT

A control arrangement for mixture compressing injection combustion engines with an air metering arrangement. For metering the fuel quantity in relation to the air quantity, there is provided a pivotable flap in the air suction line upstream of an arbitrarily actuated butterfly valve. This pivotable flap is urged by a spring in the closing direction. The flap is located outside the flow cross section in the suction line wall, and responds to the difference between pressures acting upstream and downstream of the flap. The flap also controls a device for metering the fuel quantity with a part of the flap representing the pivotable wall of a chamber located outside the flow cross section of the air suction line. A connection is provided from the chamber to the suction line downstream of the flap. A support axis upstream of the flap region determines the air flow cross section on the end of the flap facing away from the flap region, with the wall extending between this flap region and the support axis. The wall has an effective working surface which is larger than the flow cross section of the air suction line. The flap, furthermore, has at least one side wall with a curve track on which a lever is guided by a roller, and is located on an axis of the device for metering the fuel quantity.

7 Claims, 2 Drawing Figures

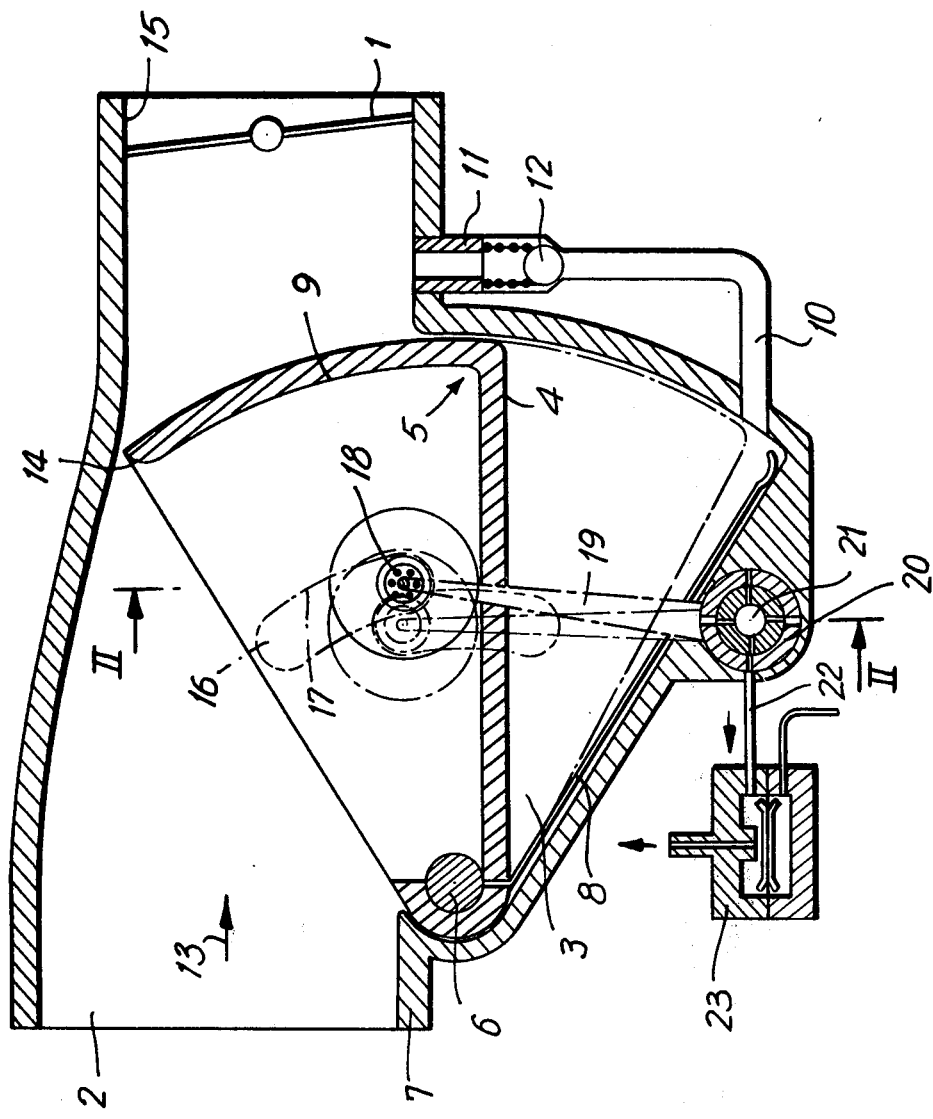

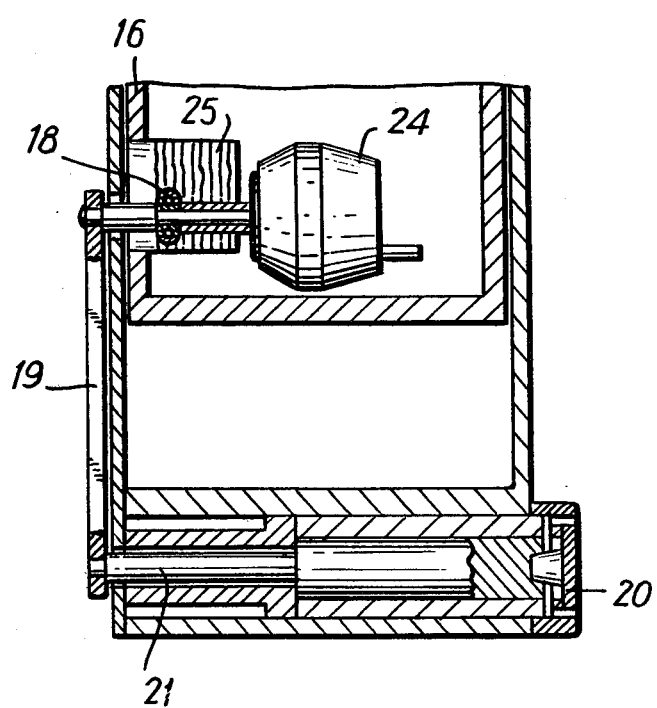

CONTROL ARRANGEMENT FOR MIXTURE COMPRESSING COMBUSTION ENGINES

BACKGROUND OF THE INVENTION

The present invention is a Continuation-In-Part of the parent application Ser. No. 750,895, filed Dec. 15, 1976, now abandoned.

The present invention relates to a control arrangement for mixture-compressing injection combustion engines with an air quantity metering arrangement for metering the amount of fuel in relation to the amount of air. In the air suction line, upstream from a butterfly valve actuated at random, there is a flap which is pivotable about a bearing shaft located in the suction line wall outside the flow cross section and which acts against the force of a spring in the closure direction. This flap is actuated by the difference between the pressures prevailing upstream and downstream of the flap and controls a device for metering the fuel quantity, part of the flap constitutes a pivotable wall between the suction line and a chamber located outside the flow cross section of the air suction line. This part of the flap is solidly attached to the flap region determining the air flow cross section. There is a connection from the chamber to the suction line downstream from the flap.

Such an arrangement is known from U.S. Pat. No. 3,880,125. The flap described there has the object of metering the required fuel quantity to the combustion engine depending on the operating point and the measured air quantity. The known flap, used for metering the amount of air, has the disadvantage that it is sensitive to the pressure fluctuations in the suction pipe — called pulsations — which are caused by load changes in the engine; these pulsations impair fuel regulation and thus require damping. For this purpose, a wing of the flap is immersed in a chamber where the wing acts on an air cushion and where air is sucked into the chamber during motion of the wing when the chamber volume is increased. However, optimum damping cannot be achieved with this arrangement. The chamber is merely used for damping the flap motion.

The correcting force is provided only at the flap region which determines the air flow cross section by the difference between the pressures prevailing upstream and downstream from the flap. Downstream from the flap, the pressure is the same as in the chamber which can be ventilated to change the damping effect. The control forces which can be produced by this arrangement are too small for a mechanical fuel metering device. With the flap in position, the flow can produce an airfoil effect which produces a restoring moment, resulting in distorted values. Similarly distorted values of the fuel/air ratio or of the fuel quantity for vehicle movement result in the presence of suction pipe backfires, since then the occurring forces suddenly close the flap.

It is, therefore, an object of the present invention to provide a control arrangement for mixture compressing injection combustion engines with an air quantity metering arrangement whose flap arrangement, to a large extent, avoids the effect of pulsations in the presence of sufficiently large correcting forces, but retains, even with suction pipe backfires, the position corresponding to vehicle movement and meters the fuel proportional to the air — but as a function of the load.

Another object of the present invention is to provide a control arrangement of the foregoing character which is compact in construction.

A further object of the present invention is to provide a control arrangement, as described, which may be economically fabricated and easily maintained in service.

SUMMARY OF THE INVENTION

The objects of the present invention are achieved by providing a control arrangement in which the air suction line has a pivotable flap upstream of an arbitrarily actuated butterfly valve. The pivotable flap acts against the force of a spring which urges the flap in a closing direction.

The flap is located outside the flow cross section in the suction line wall, and this flap responds to the difference between pressures acting upstream and downstream of the flap.

A device for metering the fuel quantity is controlled by the flap and a part of the flap represents the pivotable wall of a chamber located outside the flow cross section of the air suction line. It is connected rigidly with the flap region determining the air flow cross section.

A connection is provided from the chamber to the suction line downstream of the flap where the support axis of the flap determines the air flow cross section on the end of the flap facing away from the flap region. The wall extends between this flap region and the support axis, and the effective working surface of this wall is larger than the flow cross section of the air suction line.

The flap has at least one side wall with a curved track on which a lever is guided by a roller. The lever is, furthermore, located on an axis of the fuel quantity metering device.

The roller can be shifted on its axis perpendicular to the lever by an underpressure or vaccum box. Furthermore, a choke (throttle) or check valve may be located in the aforementioned connection.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings.

BRIEF DESCRIPTION OF THE DRAWINGS

FIG. 1 is a sectional view and shows a control arrangement with an L-shaped flap; and FIG. 2 is a partial sectional view and shows a section taken along line II—II of FIG. 1.

DESCRIPTION OF THE PREFERRED EMBODIMENTS

The control arrangement has upstream from butterfly valve 1, an underpressure chamber 3 which is located outside the flow cross section of the air suction line 2 and which has a movable wall formed by a wing 4 with an L-shaped flap. To achieve a large correction force, the effective area of the wing is larger than the flow cross seciton of the air suction line. The flap 5 is supported via a bearing shaft 6 at the edge of the flow cross section of the air suction line 2 in housing 7 via anti-friction bearings (not shown) and is loaded by a return spring 8 in the closed position. In FIG. 1, the flap region 9 determining the air flow cross section, is located on that side of vane (wing) 4 of the flap 5, which faces shaft 6. The air suction line 2 is connected to the underpressure chamber 3 downstream from this metering surface 9 via a connection 10 in which a throttle 11 or a check valve 12 may be located. It is also possible to locate this connection in the metering surface so that the point of discharge is always at the narrowest cross section. If air flows through suction line 2 in the direction of arrow 13, a pressure drop develops across metering surface 9. The pressure downstream from the metering surface (flap region) 9 acts via connection 10 on the underside of wing (vane) 4 so that a flap opening occurs in accordance with the operating point. The pressure difference remains constant at all operating points. Through the movable surface 9, a certain cross section is continuously made available to the air suction line 2. The deflection of flap 5 about shaft 6 is proportional to the prevailing air flow.

With suction (intake) pipe backfiring, the developed force is transmitted to shaft 6 almost without deflection of flap 5. Throttle 11 or check valve 12 serves to dampen the tendency of flap 5 to engage in torsional vibrations. This tendency is caused by pulsations. The check valve prevents sudden closing of the flap in case of suction line backfires. The volume of the underpressure chamber 3 also has a damping effect. To obtain favorable flow conditions, the flap region 9 which determines the air flow cross section, has a sharp edge 14.

FIG. 1 shows how a metering device 20 of a low pressure injector (not shown) is controlled via a shaft 21 by way of a side wall 16 by means of a lever 19 guided by a roller 18 in a curved track 17. Variable fuel quantities can be provided for various operating conditions through the shape of the curved track 17. From the metering device 20, one or more lines 22 lead to a known differential pressure valve which may, for example, be temperature regulated.

The dot-dash line shows the position of the flap 5 with fully opened exit cross section 15 at maximum air flow. A dot-dash line also shows the position assumed by the lever 19 and roller 18 relative to the curved track 17.

In order to provide a load dependent fuel adaptation depending on the suction line underpressure, it is convenient, according to FIG. 2 that the roller 18 on its shaft be movable perpendicular to lever 19 by means of an underpressure element 24. The angle of rotation of lever 19 is not controlled via the curved track 17 but over a three-dimensionally curved surface 25 located in place of the curved track. Such surfaces are knows as the so-called space (three-dimensional) cams.

Without further analysis, the foregoing will so fully reveal the gist of the present invention that others can, by applying current knowledge, readily adapt it for various applications without omitting features, that from the standpoint of prior art, fairly constitute essential characteristics of the generic or specific aspects of this invention, and therefore, such adaptations should and are intended to be comprehended within the meaning and range of equivalents of the following claims.

What we claim is:

1. A control arrangement for air-fuel mixture compressing injection combustion engines, comprising: an air quantity metering arrangement for metering air quantity in relation to fuel quantity; an arbitrarily actuated butterfly valve; an air suction line having a pivotable flap upstream from said arbitrarily actuated butterfly valve; spring means for urging said flap into a closing position; said flap being located outside the flow cross section in a wall of said suction line, said flap responding to a difference of pressures acting upstream and downstream of said flap, said flap controlling means for metering fuel quantity; said flap having a part corresponding to a pivotable wall of a chamber located outside the flow cross section of the air suction line and being connected rigidly with a region of said flap determining the air flow cross section; connecting means from said chamber to said suction line downstream of said flap; said flap having a support axis located upstream on the end of said flap facing away from said flap region; a wall extending between said flap region and said support axis; said wall having an effective working surface larger than the flow cross section of said air suction line; fuel quantity metering means; lever means located on an axis of said fuel quantity metering means; roller means for guiding said lever means; said flap having at least one side wall with a curved track for guiding said roller means and positioning said fuel quantity metering means by said lever means.

2. A control arrangement as defined in claim 1 including box means under vacuum, said roller means being shiftable on its axis perpendicular to said lever means by said box means.

3. A control arrangement as defined in claim 1 including choke means located in said connecting means.

4. A control arrangement as defined in claim 1 including check valve means located in said connecting means.

5. A control arrangement as defined in claim 1 including throttle means located in said connecting means.

6. A control arrangement as defined in claim 1 wherein said curved track means comprises a three-dimensionally curved surface for controlling the angle of rotation of said lever means.

7. A control arrangement as defined in claim 4 wherein said check valve prevents sudden closing of said flap upon suction line backfiring, the flap region determining the air flow cross section having a sharp edge, variable fuel quantities for various operating conditions being dependent on said curved track.

* * * * *